(12) United States Patent
Chenault

(10) Patent No.: US 6,990,488 B1
(45) Date of Patent: Jan. 24, 2006

(54) MAINTAINING THE CURRENCY OF AVAILABILITY INFORMATION FOR BUNDLES OF ITEMS

(75) Inventor: John Chenault, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 179 days.

(21) Appl. No.: 09/995,966

(22) Filed: Nov. 28, 2001

(51) Int. Cl.
*G06F 17/30* (2006.01)

(52) U.S. Cl. .................... 707/7; 707/4; 707/8

(58) Field of Classification Search .......... 707/1–10, 707/100, 101, 102, 205; 705/1, 26, 37; 709/202, 709/228, 207, 205
See application file for complete search history.

(56) References Cited

U.S. PATENT DOCUMENTS

| | | | | | |
|---|---|---|---|---|---|
| 5,239,480 | A | * | 8/1993 | Huegel | 705/5 |
| 5,930,761 | A | * | 7/1999 | O'Toole | 705/5 |
| 2002/0010659 | A1 | * | 1/2002 | Cruse et al. | 705/28 |
| 2002/0042756 | A1 | * | 4/2002 | Kumar et al. | 705/26 |
| 2002/0077919 | A1 | * | 6/2002 | Lin et al. | 705/26 |
| 2002/0077929 | A1 | * | 6/2002 | Knorr et al. | 705/26 |

* cited by examiner

*Primary Examiner*—C Rones
*Assistant Examiner*—Neveen Abel-Jalil
(74) *Attorney, Agent, or Firm*—Perkins Coie LLP

(57) ABSTRACT

A facility for determining availability status for item groups each containing one or more items is described. For each item whose availability status changes, for each item group containing the item, the facility adds the item group to a list of item groups if the item group is not already present in the list. The facility periodically removes a plurality of item groups from the list. For each item group it removes from the list, the facility determines an availability status for the item group based upon availability statuses of items contained in the group.

41 Claims, 6 Drawing Sheets

MAINTAINING THE CURRENCY OF AVAILABILITY INFORMATION FOR BUNDLES OF ITEMS

FIELD

The present invention is directed to the field of electronic commerce.

BACKGROUND

The World Wide Web ("the Web") is a system for publishing information, in which users may use a web browser application to retrieve information, such as web pages, from web servers and display it.

The Web has increasingly become a medium used to shop for products. Indeed, thousands and thousands of different products—as well as other items such as service contracts—may be purchased on the Web. A user who plans to purchase an item on the Web can visit the Website of a Web merchant that sells the item, view information about the item, give an instruction to purchase the item, and provide information needed to complete the purchase, such as payment and shipping information.

It is typical for a user to view information about a product on an "item detail page." The information provided on an item detail page may include such information as the item's name and source, a picture of the item, a description of the item, reviews or ratings of the item, a price at which the item is offered for sale, and a control—such as a button—that may be activated by the user to order the item from the web merchant.

In some senses, shopping at a web merchant is significantly more compelling than shopping at a physical merchant. For example, a user that shops at a web merchant can complete a shopping task without the extra inconvenience, time cost, and pecuniary cost associated with visiting a physical merchant in person. Also, a user may shop at two or more web merchants simultaneously, permitting him or her to simultaneously gather information about the product from several sources.

Although shopping at a web merchant has several distinct advantages such as those discussed above, shopping at conventional web merchants sometimes has certain disadvantages, relating to the generation and use of information describing the availability of items sold by a merchant. One such disadvantage is that it is often difficult for a user considering ordering an item from an online merchant to understand when the item would be received from the web merchant. While many web merchants provide a certain level of information on an item's detail page about how soon the item can be shipped by the merchant or received by the user, this information is often imprecise, or even inaccurate. Item availability information may be imprecise in cases where the web merchant displays item availability using large ranges of availability times, such as "1–2 weeks." Item availability information may be inaccurate in cases where the availability information reported by the web merchant is slow to reflect changes in the merchant's inventory, such as those produced by recent sales or supplier shipments of the item. Attempts to provide precise and accurate availability information is in many cases confounded by a merchant's use of several different distribution centers and item suppliers, information from all of which must be timely and accurately incorporated in any useful determination of item availability. Because this uncertainty about item availability from conventional web merchants is contrasted with users' typical experience of purchasing in-stock items from physical merchants and taking the items home immediately, some users may prefer to continue to purchase from physical merchants despite the advantages provided by web merchants.

Additionally, sometimes a user that is willing to order an items from a web merchant is disappointed by the web merchant's failure to decide effectively whether to accept an order for the item. For example, in some cases, a web merchant may accept an order for an item that, in addition to being out of stock at the merchant, is without prospect of replenishment, such as an item that is out of print, or an item that was formerly obtained from a single supplier that has ceased carrying the item. As second example, a web merchant may refuse to accept an order for an item that, while it is currently out of stock, will be received by the merchant from a supplier in a short time. This second phenomenon can prevent a web merchant from effectively accepting pre-orders for a highly-anticipated item whose release date is in the near future.

The described difficulties in determining the availability of items are compounded for determining the availability of groups, or "bundles," of different items that may be purchased together, since the availability of a bundle is predicated on the availability of each of its constituent items. As one example, a bundle of items may include a package of golf balls, a golfing book, and a golfing video. The availability of this bundle is based upon the availability of all of the three constituent items, and has the potential to change any time the availability of any of the constituent items changes. For an item that is part of more than one bundle, a change to the availability of the item may change the availability of each of the bundles that contain it. For example, the golfing video item may be part of 450 different bundles. When an order is received for the golfing video item, or a shipment of more golfing video items is received, this may change the availability of each of these 450 bundles.

In view of the high level of dependency of bundle availability information on constituent item availability information, static bundle availability information can quickly fall out of date for merchants in which changes in constituent item availability are frequent. Conventional approaches to maintaining the currency of bundle availability information have significant disadvantages.

Typically, such approaches involve either periodically updating the availability of all bundles, or updating the availability of certain bundles in response to the occurrence of an event. Periodically updating the availability of all bundles generally consumes great quantities of processing power, wasting significant computing resources to determine availability for bundles whose availability couldn't have changed. Accordingly, this approach typically requires expensive dedicated hardware, involves relegating the update cycle to be relatively infrequent, and prevents effective scaling to larger numbers of bundles. Alternatively, if this level of resources is not dedicated to the implementation of this approach, the implementation generally cannot maintain availability information that is current enough to support accurate inventory planning and promising.

Updating the availability of certain bundles in response to the occurrence of an event, such as each time the availability of a constituent item changes, or each time a request for the availability of a bundle is requested, can be similarly inefficient. Such approaches commonly also consume great quantities of processing power. Additionally, by updating in response to external events, users of this approach relinquish control over when such processing power is used, and in what quantity.

In light of the disadvantages discussed above, an efficient, effective approach to tracking the availability of bundles of items would have significant utility.

DETAILED DESCRIPTION

Figure 1:
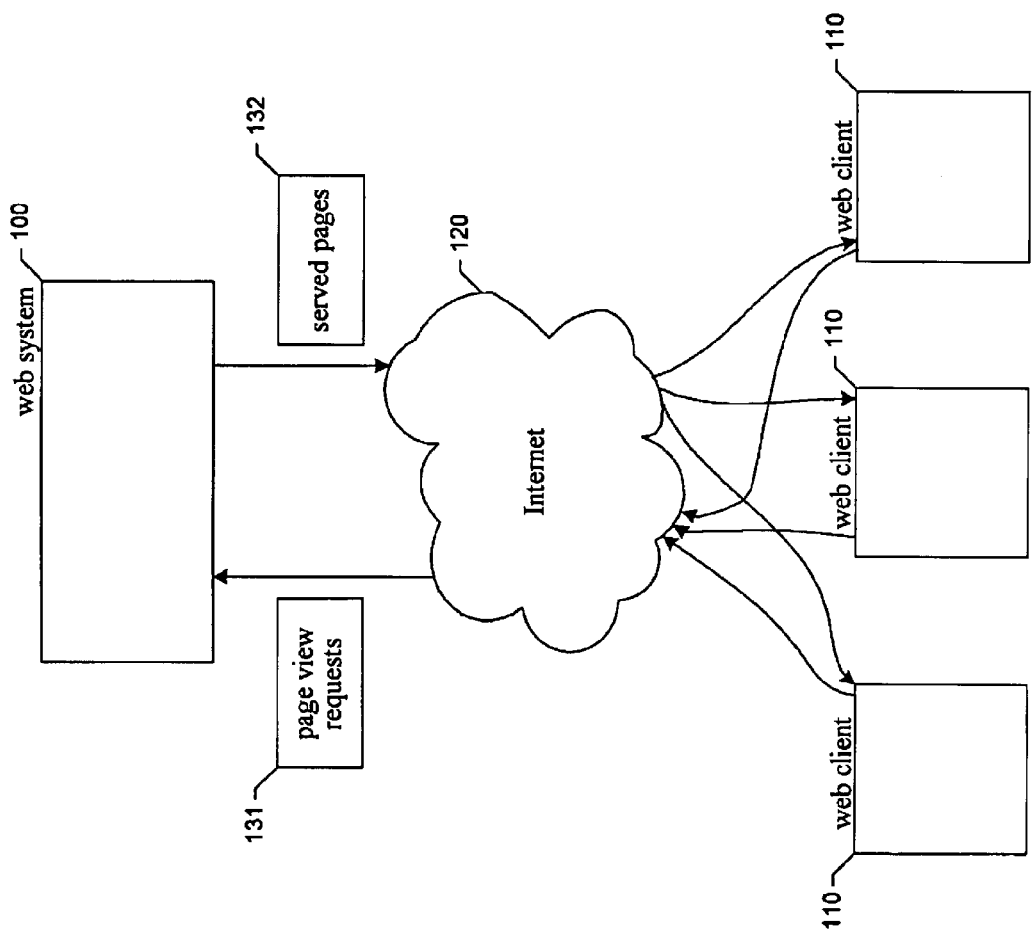
FIG. 1 is a high-level data flow diagram showing data flow within a typical arrangement of components used to provide front-end functionality of the facility.

A software facility for maintaining the currency of inventory and/or availability information for bundles of items ("the facility") is described. The facility uses asynchronous messaging to maintain the currency of a model of all current physical inventory possessed by the merchant. This inventory model can represent inventory at a number of different distribution centers ("distribution centers") or other locations used by the merchant to store inventory, including inventory maintained by vendors. The model further represents expected future changes to physical inventory as adjustments to the physical inventory needed to determine if inventory is available for sale. These can include complete (and, in some cases, incomplete) orders for items from customers; purchase orders expected to be received by the merchant from suppliers; and inventory transfers between distribution centers or other merchant locations.

The facility uses a special process to update inventory and availability information for bundle items that are made up of two or more constituent items. Each time the modeled inventory for a non-bundle item changes, embodiments of the facility determine which bundles contain this non-bundle item. The facility adds the bundle item corresponding to each of these bundles to a list of bundle items, call the "changed list" of bundle items, unless the bundle item is already on the list. Periodically, the facility removes up to a maximum number of bundle items from this list in first-in-first-out ("FIFO") order, and updates the modeled inventory for each of these bundle items based upon the modeled inventory for the non-bundle items that make up these bundle items.

In committing each inventory update for an item to its inventory model, the facility determines whether the update changes the availability status of the item. In cases where it does, the facility delivers an asynchronous message from the inventory system to a web system, which uses such messages to maintain an up-to-date model of item availability for ordering from the merchant. When a customer requests an item detail web page for a particular item from the merchant, the web system uses the item availability model to generate up-to-date characterizations of the availability of the item, such as how soon the merchant can ship the item out or make the item available for shipping, which it incorporates in the requested item detail web page. In many embodiments, the timing information in the item availability model is relatively finely-grained, enabling the characterization to be relatively precise with respect to how soon the merchant can ship the item out. In some cases, indications of how soon the merchant can ship the item out are based on historical information about how quickly the merchant has been able to resupply itself for similar items from suppliers that carry the item.

The web system typically also uses the item availability model to determine which types of ordering controls, if any to include on the item detail page. For example, for an item that won't be available in the near future but is expected to be available later, the facility may include a control in the item detail page for placing the item on the user's wish list for later ordering, but may omit controls for immediately ordering the item. Also, when the merchant receives an order for an item, such as an order generated by the customer using ordering controls included in the item detail page, the facility typically rechecks the item availability model to ensure that the item is still available for order before it accepts the order from the customer.

Use of the facility enables the merchant to display specific and accurate information about whether bundle items are available for purchase, what quantities of bundle items are available for purchase, and how soon they can be shipped. Use of the facility further helps the merchant avoid accepting orders for bundle items that cannot be shipped out in an acceptable period of time, and enables the merchant to accept orders for bundle items that, while not in physical inventory, will be received in inventory quickly enough to timely ship them to customers that have ordered them. Embodiments of the facility also update the bundle availability information frequently enough to provide timely and accurate inventory and availability information, while doing so efficiently using a predictable quantity of computing resources on a predictable schedule. By displaying accurate and up-to-date information about the quantity of a bundle available to order, embodiments of the facility may encourage customers to expedite the purchase of what appears to be a scarce bundle. Accordingly, the facility provides significant utility to the merchant, and to the merchant's customers.

FIG. 1 is a high-level data flow diagram showing data flow within a typical arrangement of components used to provide front-end functionality of the facility. A number of web client computer systems 110 that are under user control generate and send page view requests 131 to a web system 100 via a network such as the Internet 120. These requests typically include page view requests for item detail pages and page view requests conveying item ordering instructions. In particular, these requests may include page view requests for item detail pages for items that are bundles containing other items, and page view requests can convey item ordering instructions for items that are bundles containing other items. Within the web system, these requests may either all be routed to a single web server computer system, or may be loaded-balanced among a number of web server computer systems.

The web system typically processes such requests using information provided by back-end components discussed below in conjunction with FIG. 2, and replies to each with a served page 132. For example, for a page view request requesting an item detail page, the served page is the requested item detail page, containing information about the availability of the item, as well as any controls for ordering the item that are consistent with the item's availability. For a page view request conveying item ordering instructions, such as those generated by the user by activating an ordering control included in an earlier-served item detail page for the same item, the served page is an order confirmation page in cases in which the page view request is sent when the item is available to order, or an order declined page indicating that the item is no longer available to order.

Figure 2:
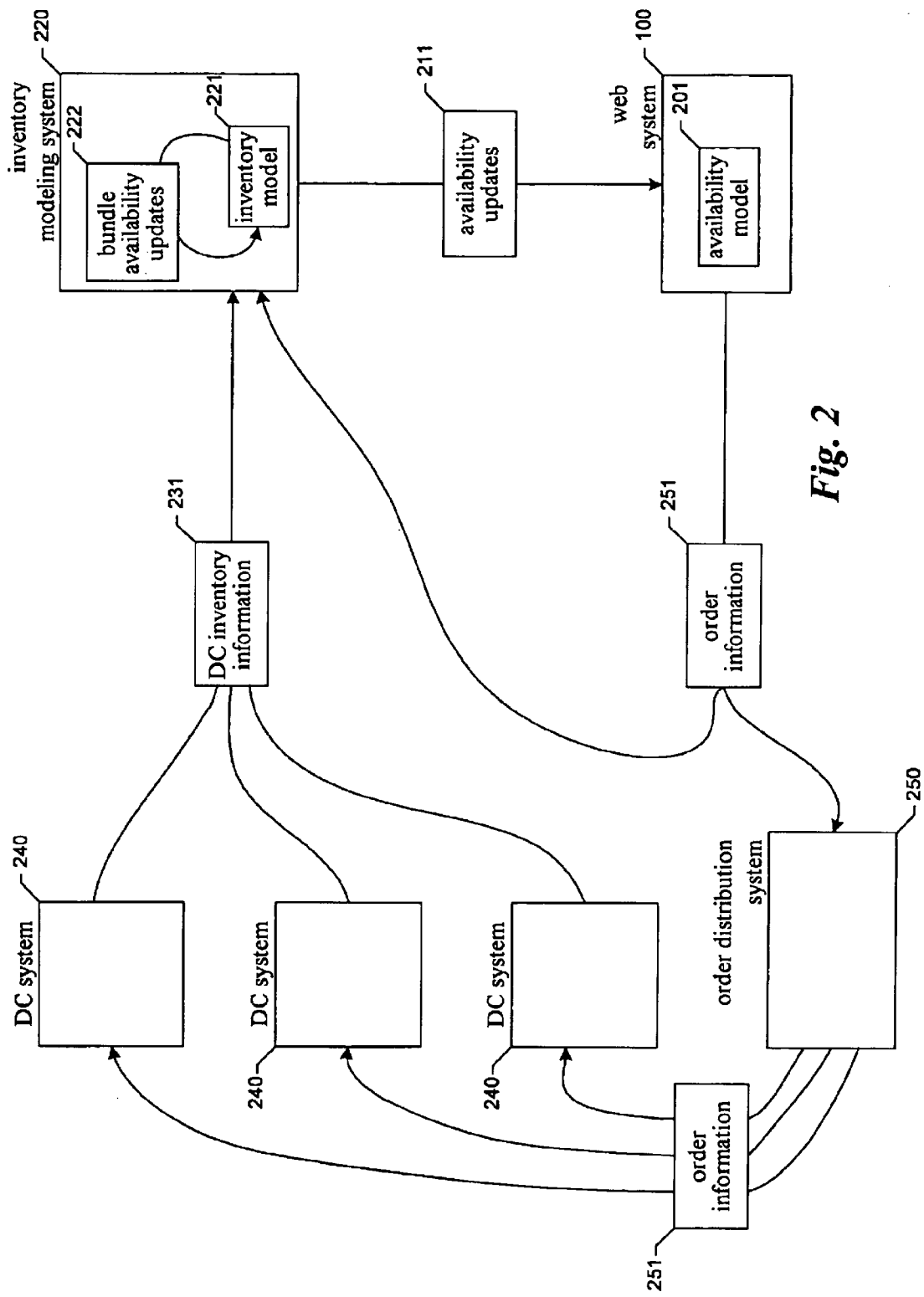
FIG. 2 is a high-level data flow diagram showing data flow within a typical arrangement of components within which the facility checks items and bundle availability.

FIG. 2 is a high-level data flow diagram showing data flow within a typical arrangement of components within which the facility checks items and bundle availability. A more detailed example of this data flow and set of components is described in U.S. patent application Ser. No. 09/921,011, which is hereby incorporated by reference in its entirety.

In general, the data flow shown and described is implemented using asynchronous messages. The web system 100 uses an item availability model 201 to process page view requests as discussed above. The item availability model models the level of availability of at least a portion of the items that may be ordered from the web merchant, and is maintained by the web system using a stream of availability updates 211, each reflecting a change in the availability status of an item.

Availability updates received by the web system are produced by an inventory modeling system 220, also referred to herein as the "GPI system." The inventory modeling system maintains an inventory model 221 reflecting the current inventory of each item held by each distribution center, as well as anticipated events that will affect such inventory, such as pending customer orders (expected to diminish inventory) and purchase orders scheduled to be delivered to distribution centers in the near future (expected to augment inventory). In some embodiments, the inventory modeling system also models the inventory of some items available from vendors supplying those items. When an inventory change for an item that reflects a change in availability of the item occurs in the inventory model, the inventory modeling system sends an availability update to the web system advising the web system of the availability change of the item.

The inventory modeling system receives inventory information from a number of sources, including distribution center systems 240 that model the inventory of each distribution center; the web system, which receives orders for items from customers; and, optionally, the order distribution system (not shown). As is described in greater detail below, the inventory modeling system further updates its inventory model with bundle availability updates 222 that it generates for bundles based upon availability information it has for the items contained in those bundles.

When the web system receives an order, it generates order information 251, which contains information identifying the items ordered and the quantity of each item ordered. The web system sends the order information to an order distribution system 250 for assignment to a distribution center, as well as to the inventory modeling system. When the order distribution system receives the order information, it delegates the order to a selected one of the web merchant's distribution centers 240 for fulfillment, forwarding the order information 251 to that distribution center. In some embodiments, the order distribution system may assign orders for certain items to drop ship vendors (not shown) rather than distribution centers. The selected distribution center processes the order described in the order information, and the corresponding distribution center system 240 sends information 231 about its inventory, updated to reflect processing of the order, to the inventory modeling system. In response, the inventory modeling system updates its inventory model. The distribution center systems periodically send other distribution center inventory updates to reflect other changes to distribution center inventory, such as purchase orders placed with or received from vendors, inter-distribution center transfer shipments sent or received, etc.

Because the order information is sent to the inventory modeling system in parallel with the order distribution system, the inventory modeling system is able to adjust its inventory model to reflect the order immediately after the order is received, rather than later, after the order has been processed by the order distribution system and a distribution center.

Figure 3:
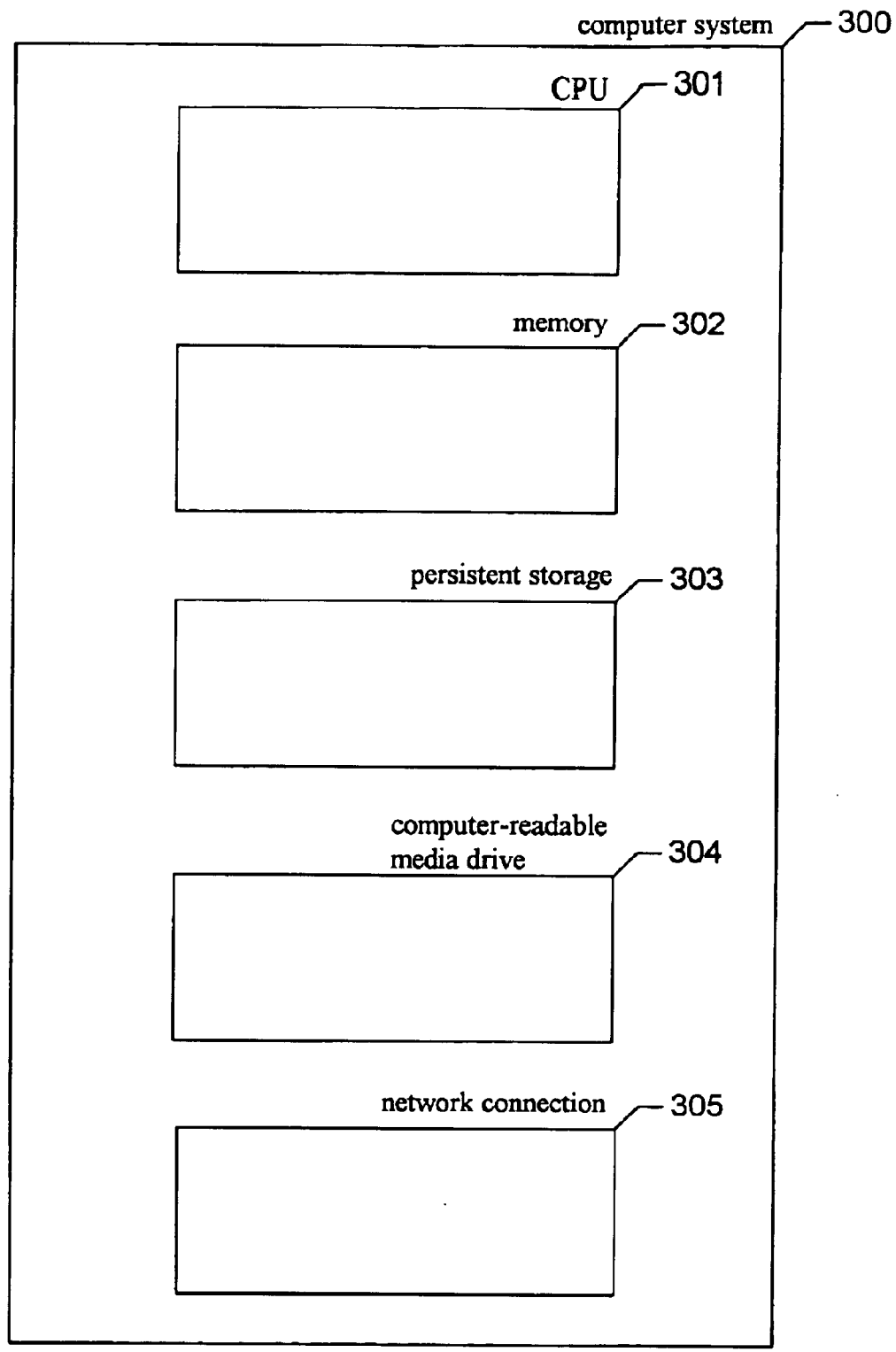
FIG. 3 is a block diagram showing some of the components typically incorporated in at least some of the computer systems and other devices on which the facility executes.

FIG. 3 is a block diagram showing some of the components typically incorporated in at least some of the computer systems and other devices on which the facility executes. These computer systems and devices 300 may include one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are preferably used to support the operation of the facility, those skilled in the art will appreciate that the facility may be implemented using devices of various types and configurations, and having various components.

Additional details about the facility's design, implementation, and use follow.

Figure 4:
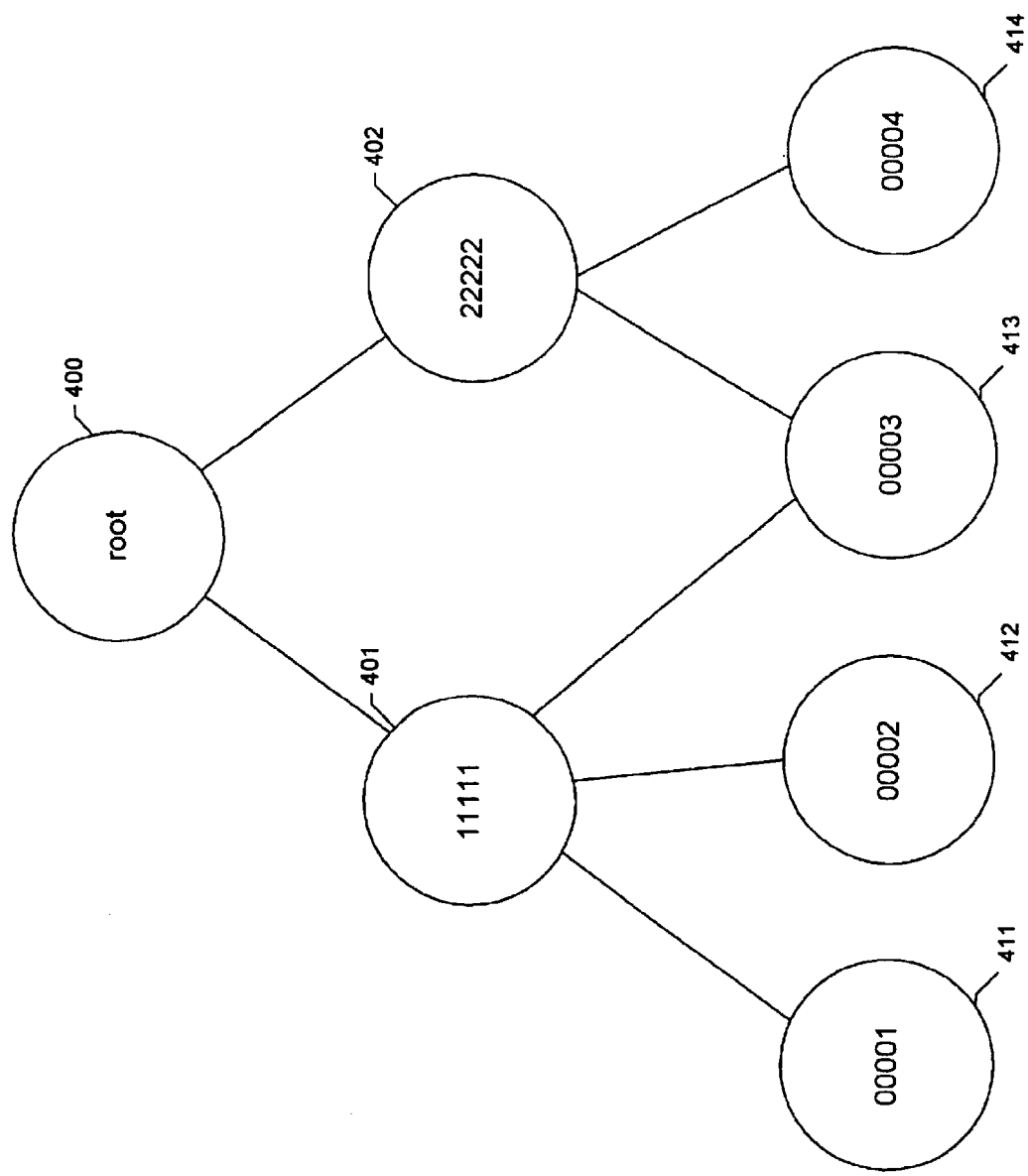
FIG. 4 is a data structure diagram showing an example bundle definition tree.

FIG. 4 is a data structure diagram showing an example bundle definition tree, which identifies, for each of a number of bundle items, the individual items contained by the bundle item. The tree has a root node 400, which is an ancestor of all of the nodes in the tree. The tree has a number of leaf nodes 411–414, each of which has no children. The leaf nodes represent individual items, i.e., those items that are not bundles. Non-leaf nodes other than the root node represent bundle items. Here, individual item 00001 may be a package of golf balls, individual item 00002 may be a golfing book, individual item 00003 may be a golfing video, and item 00004 may be a football video. The bundle item represented by a non-leaf node contains all of the individual items represented by the leaf nodes that are descendants of the non-leaf node. For example, it can be seen from FIG. 4 that bundle item 11111, represented by node 401, contains individual items 00001, 00002, and 00003, represented by nodes 411, 412, and 413, respectively. That is, item 11111 is a bundle item containing the package of golf balls item, the golfing book item, and the golfing video item. Similarly, bundle item 22222, represented by node 402, contains individual items 00003 and 00004, represented by nodes 413 and 414, respectively. In other words, bundle item 22222 is a bundle item containing the golf video item and the football video item.

In some embodiments, leaf nodes may be children of the root node, representing individual items that are not part of any bundle (not shown). Additionally, non-leaf nodes other than the root node representing bundle items may be non-parent ancestors of leaf nodes, representing bundles that contain one or more other bundles (not shown). In some embodiments, the root node is omitted from the bundle definition tree. It should be noted that a very small tree is shown to facilitate discussion, and that the facility is capable of operating in conjunction with the bundle definition tree of much greater size and complexity than shown here.

In some embodiments, rather than representing bundle definitions in a tree as shown in FIG. 4, the facility represents them in a table, such as a database table. Table 1 below shows in table form the same information contained in FIG. 4.

TABLE 1

| Bundle Item | Leaf Item |
|---|---|
| 11111 | 00001 |
| 11111 | 00002 |
| 11111 | 00003 |
| 22222 | 00003 |
| 22222 | 00004 |

Figure 5:
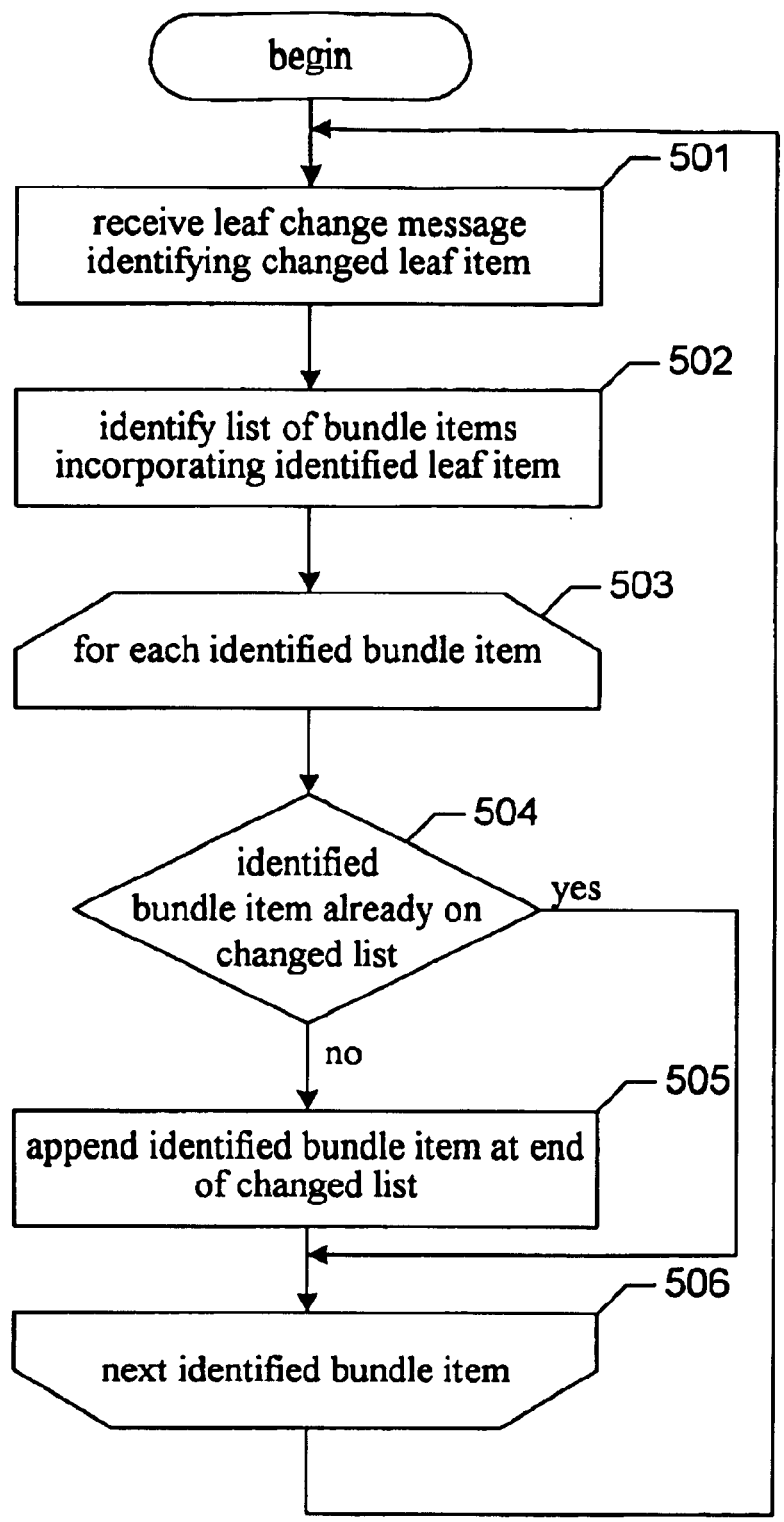
FIG. 5 is a flow diagram showing steps typically performed by the facility in order to stage bundles for availability update.
Figure 6:
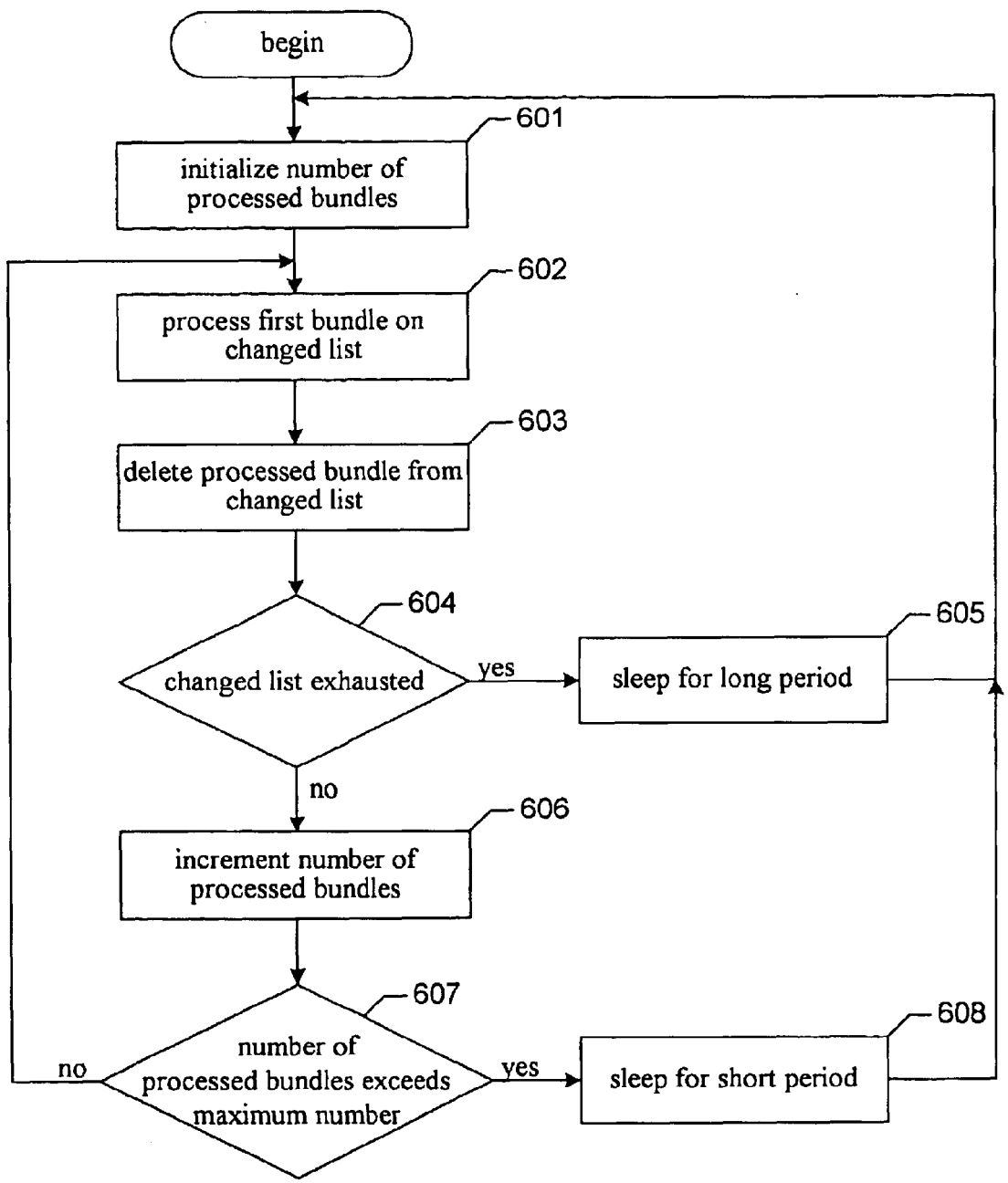
FIG. 6 is a flow diagram showing steps typically performed by the facility in order to periodically update the availability statuses of selected bundle items.

FIGS. 5 and 6 show processes employed by embodiments of the facility in order to selectively update the availability status of bundles of items. FIG. 5 is a flow diagram showing steps typically performed by the facility in order to stage bundles for availability update. In some embodiments, these steps are performed once each time a message is received indicating that availability is changed for an individual item (i.e., a non-bundle item).

In step 501, the facility receives a leaf change message identifying a leaf item whose availability status has changed. This leaf change message may indicate that larger or smaller quantities are immediately available at any of the distribution centers, for example, or that fewer or more of the item will be available at a distribution center in the future. In step 502, the facility identifies the list of bundle items incorporating the identified leaf item. Where the facility maintains a tree data structure such as that shown in FIG. 4 to track the bundle items contained in each leaf item, the facility starts at the node representing the changed leaf item, and traverses up to each of the ancestors of this leaf item. For example, for item 00003, the facility begins at node 413, and traverses up to nodes 401 and 402 to identify items 11111 and 22222 as bundle items incorporating the changed leaf item. In cases where bundle content information is represented in a database table like that shown above in Table 1, the facility searches for each row of the table containing the item number of the identified leaf item, and collects the corresponding bundle item identification numbers.

In steps 503–506, the facility loops through each bundle item identified in step 502. In step 504, if the identified bundle item is already on a list of changed bundle items, then the facility continues in step 506, else the facility continues in step 505. In step 505, the facility appends the identified bundle item at the end of the changed list. In step 506, if additional identified bundle items remain to be processed, the facility continues in step 503 to process the next one, else the facility continues in step 501 to receive the next leaf change message.

The facility uses the list generated by step 505 shown in FIG. 5, also called a "queue," to periodically reevaluate the availability status of selected bundles whose constituent leaf items have undergone availability status changes. FIG. 6 is a flow diagram showing steps typically performed by the facility in order to periodically update the availability statuses of selected bundle items. In step 601, the facility initializes a counter of the number of processed bundles. In step 602, the facility processes the first bundle on the changed list, i.e., the bundle item least recently appended to the end of the changed list in step 505 shown in FIG. 5. The processing of this bundle item in step 602 is described in greater detail below, but essentially involves adopting for the bundle item the most restrictive availability status of any of its constituent leaf items. In step 603, the facility deletes from the changed list the bundle processed in step 602. In step 604, if the changed list has now been exhausted, i.e., no longer contains any bundle items, then the facility continues in step 605, else the facility continues in step 606. In step 605, the facility sleeps for a relatively long period of time, such as five seconds. After step 605, the facility continues in step 601 to resume processing bundle items that have been added to the changed list during the sleep period. In step 606, the facility increments the number of processed bundles. In step 607, if the number of processed bundles exceeds the maximum number of bundles, such as 500 bundles, then the facility continues in step 608, else the facility continues in step 602 to process the next bundle item on the changed list. In step 608, the facility sleeps for a relatively short period of time, such as one second. After step 608, the facility continues in step 601 to continue processing the bundle items on the changed list.

To more fully illustrate the facility and its operation, a detailed example is discussed below.

Sample inventory statuses for the items in the inventory model maintained by the inventory modeling system are as shown below in Table 2.

TABLE 2

Item 00001
    GlobalReservations = 0;
    ReplenishmentStrategy = DO_NOT_REPLENISH;
    SEA1
        InInventory = 600;
Item 00002
    GlobalReservations = 0;
    ReplenishmentStrategy = VIRTUAL,
Item 00003
    GlobalReservations = 0;
    ReplenishmentStrategy = DO_NOT_REPLENISH;
    SEA1
        InInventory = 6;
    PHL1
        InInventory = 1;
Item 00004
    GlobalReservations = 0;
    ReplenishmentStrategy = DO_NOT_REPLENISH;
    SEA1
        Reserve (48 hours) = 15;
    PHL1
        InInventory = 20;

It can be seen that each inventory status entry identifies the number of the item to which it pertains; the quantity of the item that is reserved for orders that have been placed, but not yet assigned to a particular distribution center ("GlobalReservations"); a replenishment strategy indicating how the item is to be replenished; and inventory statuses for each of one or more distribution centers. Possible values for replenishment strategies are as follows: DNR—do not replenish; DNS—the merchant sells this item, but does not stock in any of its distribution centers; AUTOMATIC—the item is automatically ordered from vendors, enabling it to be sold even when not in stock at the distribution centers; MANUAL—replenished using manual processes;

VIRTUAL—items with which no physical stock is associated, always in inventory (e.g., an electronic book); DERIVED—inventory in this item is derived from inventory in other items (e.g., bundle items); UNKNOWN—replenishment strategy is not known, and assumed for most purposes to be AUTOMATIC.

For example, it can be seen from the contents of Table 2 that no unassigned orders have been placed for item 00003, its inventory will not be replenished once exhausted, and a Seattle distribution center ("SEA1") has a quantity of 6 in inventory, while a Philadelphia distribution center ("PHL1") has a quantity of 1 in inventory.

As shown below in Table 3 below, the facility creates bundle items that are the intersection of the leaf item inventory statuses shown in Table 2.

TABLE 3

Item 11111
GlobalReservations = 0;
ReplenishmentStrategy = DERIVED;
SEA1
    InInventory = 6;
Item 22222
GlobalReservations = 0
ReplenishmentStrategy = DERIVED;
SEA1
    Reserve (48 hours) = 6;
PHL1
    InInventory = 1;

The Website display for bundle 11111 at the inventory status shown in Table 3 is '6 units in inventory.' The Website display for bundle 22222 at the inventory status shown in Table 3 is '1 unit in inventory.'

At this point, a customer enters an order for bundle item 11111. In response, the web system publishes a CustomerOrderCreated message containing one each of items 11111, 00001, 00002, and 00003.

The inventory modeling system receives the message and updates the inventory status for the leaf items 00001, 00002, and 00003. It then publishes a 'LeafChange' message for each item 00001, 00002, 00003, which is listened for by a bundle daemon.

At this point, the three individual items 00001, 00002, and 00003 have a global reservation set to 1.

When the inventory modeling system gets a LeafChange message, it gets a list of all of the bundle items that are ancestors of that leaf. The bundle daemon puts these bundle items in a queue. (Duplicate entries are excluded from the queue). In this example, when the inventory modeling system has received all three leaf change events, the queue contains two entries: 11111 and 22222.

At a later point in time (i.e., within a few seconds), a timer expires and processes of the first several hundred bundles in the queue. Processing consists of taking each bundle in the queue, getting the leaf nodes for the bundle, and combining those nodes to create a new availability for the bundle. The new bundle availability is then written to the inventory model and, if that causes the availability of any bundle items to change, the inventory modeling system publishes an AvailabilityChangeMessage for these bundle items.

In response, the facility reads the current leaf availabilities (as updated by the inventory modeling system), shown below in Table 4.

TABLE 4

Item 00001
GlobalReservations = 1;
ReplenishmentStrategy = DO_NOT_REPLENISH;
SEA1
    InInventory = 600;
Item 00002
GlobalReservations = 1;
ReplenishmentStrategy = VIRTUAL;
Item 00003
GlobalReservations = 1;
ReplenishmentStrategy = DO_NOT_REPLENISH;
SEA1
    InInventory = 6;
PHL1
    InInventory = 1;
Item 00004
GlobalReservations = 0;
ReplenishmentStrategy = DO_NOT_REPLENISH;
PHL1
    InInventory = 20;
SEA1
    Reserve (48 hours) = 15;

The facility recomputes a bundle by examining the list of leaf items for that bundle, in order. The facility builds a bundle by first combining the inventory from the first two leaf items for that bundle. The facility then combines the built bundle with the third leaf item, creating a new bundle. The facility then combines this new bundle with the next leaf item until the list of leaf items is exhausted. The final computed bundle availability is then used as the availability for the bundle that represents the list of leaf items.

In this example, the first bundle 11111 is computed by creating a temporary bundle from items 00001 and 00002, then combining this temporary bundle with item 00003. The facility first creates a data structure to represent the temporary bundle. The facility then looks at the replenishment strategy of items 00001 and 00002, and notices that one of them is virtual (i.e., the merchant has an unlimited supply). That means that the facility simply makes the bundle look like the non-virtual item, as shown below in Table 5.

TABLE 5

TempBundle
GlobalReservations = 1;
ReplenishmentStrategy = BUNDLE;
SEA1
    InInventory = 600;

The facility then combines the temporary bundle with the next item, 00003. Because there are no virtuals, the first thing the facility does is to strip out the global reservations. The facility does this pessimistically: it takes enough global reservations from every distribution center, as it cannot be sure which distribution center will actually be used. Table 6 below shows the availability status after the global inventory has been stripped out.

TABLE 6

TempBundle (items 00001 + 00002)
GlobalReservations = 0;
ReplenishmentStrategy = BUNDLE
SEA1
    InInventory = 599;
Item 00003
GlobalReservations = 0;
ReplenishmentStrategy = DO_NOT_REPLENISH;

TABLE 6-continued

```
SEA1
        InInventory = 5;
PHL1
        InInventory = 0;
```

The facility then goes through the inventory for each distribution center and computes how many would be available at both distribution centers as time advances into the future. For SEA1, the facility sees that at time 0 (i.e., in current inventory) the minimum available is 5. As no more units are arriving in the future for item 00003, that is all that can be moved into the new temporary bundle.

Also notice that there is no PHL1 distribution center inventory for the existing bundle. This implies that the new temporary bundle will not have any PHL1 inventory.

The facility then creates a new temporary bundle as shown below in Table 7.

TABLE 7

```
TempBundle (items 00001 + 00002 + 00003)
GlobalReservations = 0;
ReplenishmentStrategy = BUNDLE;
SEA1
        InInventory = 5;
```

The inventory modeling system replaces the entry for the bundle item 11111 with this new temporary bundle. This causes a change in availability, and an item availability update message is propagated from the inventory modeling system to the web system. The web system gets the message, updates its cache, and the next time a detail page is presented for item 11111, it displays a message reflecting these new cache contents, such as 5 units in stock.

The inventory modeling system then processes the second bundle 22222. It gets the leaf node inventory status shown below in Table 8.

TABLE 8

```
Item 00003
GlobalReservations = 1;
ReplenishmentStrategy = DO_NOT_REPLENISH;
SEA1
        InInventory = 6;
PHL1
        InInventory = 1;
Item 00004
GlobalReservations = 0;
ReplenishmentStrategy = DO_NOT_REPLENISH;
SEA1
        Reserve (48 hours) = 15;
PHL1
        InInventory = 20;
```

Following the model above, the facility first strips out global inventory from Both items, leaving the inventory status show below in Table 9.

TABLE 9

```
Item 00003
GlobalReservations = 0;
ReplenishmentStrategy = DO_NOT_REPLENISH;
SEA1
        InInventory = 5;
PHL1
```

TABLE 9-continued

```
        InInventory = 0;
Item 00004
GlobalReservations = 0;
ReplenishmentStrategy = DO_NOT_REPLENISH;
SEA1
        Reserve (48 hours) = 15;
PHL1
        InInventory = 20;
```

The facility then creates a new bundle shown be low in Table 10, and uses it to update item 22222. This causes a change in availability, as well as a change in the detail page status to '15 units available in 48 hours.'

TABLE 10

```
Temporary Item
ReplenishmentStrategy = DERIVED;
SEA1
        Reserve (48 hours) = 5;
PHL1
        0
```

At a later point, the order for bundle item 11111 is sent to the SEAL distribution center for fulfillment. This generates an inventory update message from the distribution center against a specific order id. This message is consumed by the inventory modeling system, which modifies shared memory to reflect that the global inventory has been consumed and assigned to a distribution center. The status of the leaf items is changed to be as shown below in Table 11.

TABLE 11

```
Item 00001
GlobalReservations = 0;
ReplenishmentStrategy = DO_NOT_REPLENISH;
SEA1
        InInventory = 599;
Item 00002
GlobalReservations = 0;
ReplenishmentStrategy = VIRTUAL
Item 00003
GlobalReservations = 0;
ReplenishmentStrategy = DO_NOT_REPLENISH;
SEA1
        InInventory = 5;
PHL1
        InInventory 1;
Item 00004
GlobalReservations = 0;
ReplenishmentStrategy = DO_NOT_REPLENISH;
SEA1
        Reserve (48 hours) = 15;
PHL1
        InInventory = 20;
```

This causes another set of leaf change messages to be published, and bundles to be recomputed in the bundle daemon.

Note that when the inventory status of bundle 22222 is computed, some inventory is now available in PHL1. The temporary item status for bundle 22222 is shown below in Table 12.

TABLE 12

```
Temporary item
GlobalReservations = 0
```

TABLE 12-continued

```
        ReplenishmentStrategy = DERIVED;
    SEA1
            Reserve(48 hours) = 5
    PHL1
            InInventory = 1;
```

When the inventory modeling system updates this information, it publishes an item available change message, and the website will then display '1 unit in stock' for the bundle item, or one of various other messages indicating that a single unit of the bundle is immediately available, such as 'hurry, only one left.'

It will be appreciated by those skilled in the art that the above-described facility may be straightforwardly adapted or extended in various ways. For example, various data structures may be used to store information about bundles that are staged for later inventory status recalculation. Additionally, the facility may be straightforwardly adapted to calculating the status of bundles other than bundles of items offered for sale. Additionally, the facility may operate in a variety of different logical and physical environments. While the foregoing description makes reference to preferred embodiments, the scope of the invention is defined solely by the claims that follow and the elements recited therein.

I claim:

1. A method in a computing system for updating the availability status attributed to predefined groups of offered items, comprising:

initializing a FIFO queue of item groups to be empty;

receiving a plurality of messages, each message identifying an offered item and indicating that the availability status of the identified item has changed;

in response to each received message:

identifying any item groups containing the identified item;

for each identified item group:

if the identified item group is not present in the queue of item groups, appending the item group to the queue;

when a timer expires:

for a predetermined number of item groups in the queue of item groups:

removing the item group from the queue of item groups;

updating the availability status attributed to the item group, based upon availability statuses of the items within the item group;

if, after removing the predetermined number of item groups, the queue of item groups is empty, setting a timer having a first duration; and if, after removing the predetermined number of item groups, the queue of item groups is not empty, setting a timer having a second duration that is shorter than the first duration.

2. The method of claim 1 wherein the updating includes intersecting the availability statuses of the items within the item group.

3. The method of claim 1 wherein identifying any item groups containing the identified item includes accessing a list of item groups indexed by the items that they contain.

4. A method in a computing system for updating availability information for group items each containing one or more individual items, comprising:

detecting each of a plurality of changes to availability information of individual items;

in response to each detected change to availability information of an individual item;

identifying group items containing the individual item; and for each of the identified group items, updating availability information of the identified group item using current availability information for each of the individual items contained by the identified group item, wherein each of the following updated availability information items is updated in at least one of the identified group items:

a number of units available to sell in a closest time bucket;

the identify of the closest time bucket in which units will be available to sell;

a range of error in the closest time bucket;

the source of the units that are available to sell;

whether units can be replenished if more are needed than are in a first time bucket;

a source from which units can be replenished if more are needed than are in the first time bucket;

a replenishment cycle for the item;

whether the item is suspended from sale; and when stock in the item is expected to be exhausted.

5. The method of claim 4 wherein the detecting and identifying is performed in a first process, and wherein the updating is performed in a second process distinct from the first process.

6. The method of claim 4 wherein the detecting and identifying is performed by a first daemon, and wherein the updating is performed in a second daemon distinct from the first daemon.

7. The method of claim 4 wherein the detecting includes transmitting an asynchronous message for each detected change to availability information of an individual item.

8. The method of claim 7 wherein the identifying and updating is performed in response to receiving the transmitted asynchronous message.

9. The method of claim 4 wherein the detecting includes broadcasting to a plurality of recipients an asynchronous message for each detected change to availability information of an individual item.

10. The method of claim 4, further comprising adding the identified group items to a group item queue if not already present in the group item queue.

11. The method of claim 10 wherein availability information of group items in the group item queue is updated when a scheduling mechanism triggers the updating.

12. The method of claim 4 wherein the identifying and updating is performed immediately in response to the each detected change to availability information of an individual item.

13. The method of claim 4 wherein the identifying and updating is performed at a time later than each detected change to availability information of an individual item.

14. The method of claim 4 wherein the detecting includes receiving asynchronous messages each describing a cause for modifying availability information of an individual item.

15. The method of claim 4, further comprising, in response to a detected change to availability information of at least one individual item, for at least one of the group items identified as containing the individual item, transmitting an asynchronous message indicating the updated availability information for the group item.

16. The method of claim 4, further comprising broadcasting to a plurality of recipients an asynchronous message indicating the update of availability information for each of the identified group items whose availability information is updated.

17. A computer-readable medium whose contents cause a computing system to perform a method for updating the availability status attributed to predefined groups of offered items, the method comprising:

initializing a FIFO queue of item groups to be empty;

receiving a plurality of messages, each message identifying an offered item and indicating that the availability status of the identified item has changed;

in response to each received message:

identifying any item groups containing the identified item;

for each identified item group:

if the identified item group is not present in the queue of item groups, appending the item group to the queue;

when a timer expires:

for a predetermined number of item groups in the queue of item groups:

removing the item group from the queue of item groups;

updating the availability status attributed to the item group, based upon availability statuses of the items within the item group;

if, after removing the predetermined number of item groups, the queue of item groups is empty, setting a timer having a first duration; and if, after removing the predetermined number of item groups, the queue of item groups is not empty, setting a timer having a second duration that is shorter than the first duration.

18. The computer-readable medium of claim 17 wherein the updating includes intersecting the availability statuses of the items within the item group.

19. The computer-readable medium of claim 17 wherein identifying any item groups containing the identified item includes accessing a list of item groups indexed by the items that they contain.

20. A computer-readable medium whose contents cause a computing system to perform a method for updating availability information for group items each containing one or more individual items, the method comprising:

detecting each of a plurality of changes to availability information of individual items;

in response to each detected change to availability information of an individual item;

identifying group items containing the individual item; and for each of the identified group items, updating availability information of the identified group item using current availability information for each of the individual items contained by the identified group item, wherein each of the following availability information items is updated in at least one of the identified group items:

a number of units available to sell in a closest time bucket;

the identify of the closest time bucket in which units will be available to sell;

a range of error in the closest time bucket;

the source of the units that are available to sell;

whether units can be replenished if more are needed than are in a first time bucket;

a source from which units can be replenished if more are needed than are in the first time bucket;

a replenishment cycle for the item;

whether the item is suspended from sale; and when stock in the item is expected to be exhausted.

21. The computer-readable medium of claim 20 wherein the detecting and identifying is performed in a first process, and wherein the updating is performed in a second process distinct from the first process.

22. The computer-readable medium of claim 20 wherein the detecting and identifying is performed by a first daemon, and wherein the updating is performed in a second daemon distinct from the first daemon.

23. The computer-readable medium of claim 20 wherein the detecting includes transmitting an asynchronous message for each detected change to availability information of an individual item.

24. The computer-readable medium of claim 20 wherein the identifying and updating is performed in response to receiving the transmitted asynchronous message.

25. The computer-readable medium of claim 20 wherein the detecting includes broadcasting to a plurality of recipients an asynchronous message for each detected change to availability information of an individual item.

26. The computer-readable medium of claim 20, the method further comprising adding the identified group items to a group item queue if not already present in the group item queue.

27. The computer-readable medium of claim 26 wherein availability information of group items in the group item queue is updated when a scheduling mechanism triggers the updating.

28. The computer-readable medium of claim 20 wherein the identifying and updating is performed immediately in response to the each detected change to availability information of an individual item.

29. The computer-readable medium of claim 20 wherein the identifying and updating is performed at a time later than each detected change to availability information of an individual item.

30. The computer-readable medium of claim 20 wherein the detecting includes receiving asynchronous messages each describing a cause for modifying availability information of an individual item.

31. The computer-readable medium of claim 20, the method further comprising, in response to a detected change to availability information of at least one individual item, for at least one of the group items identified as containing the individual item, transmitting an asynchronous message indicating the updated availability information for the group item.

32. The computer readable medium of claim 20, the method further comprising broadcasting to a plurality of recipients an asynchronous message indicating the update of availability information for each of the identified group items whose availability information is updated.

33. A computing system for updating the availability status attributed to predefined groups of offered items, comprising:

an initialization subsystem that initializes a FIFO queue of item groups to be empty;

a receiving subsystem that receives a plurality of messages, each message identifying an offered item and indicating that the availability status of the identified item has changed;

a message processing subsystem that, in response to each received message:

identifies any item groups containing the identified item;
for each identified item group:
if the identified item group is not present in the queue of item groups, appends the item group to the queue;
a timer; and
a queue processing subsystem that,
when a timer expires:
for a predetermined number of item groups in the queue of item groups:
removes the item group from the queue of item groups,
updates the availability status attributed to the item group, based upon availability statuses of the items within the item group;
if, after removing the predetermined number of item groups, the queue of item groups is empty, sets a timer having a first duration; and
if, after removing the predetermined number of item groups, the queue of item groups is not empty, sets a timer having a second duration that is shorter than the first duration.

34. The computing system of claim 33 wherein the updating performed by the queue processing subsystem includes intersecting the availability statuses of the items within the item group.

35. The computing system of claim 33 wherein the identification of any item groups containing the identified item performed by the message processing subsystem includes accessing a list of item groups indexed by the items that they contain.

36. A computing system for updating availability information for group items each containing one or more individual items, comprising:
a detection subsystem that detects each of a plurality of changes to availability information of individual items;
an updating subsystem that, in response to each detected change to availability information of an individual item:
identifies group items containing the individual item; and
for each of the identified group items, updating availability information of the identified group item using current availability information for each of the individual items contained by the identified group item,
wherein each of the following availability information items is updated in at least one of the identified group items:
a number of units available to sell in a closest time bucket;
the identify of the closest time bucket in which units will be available to sell;
a range of error in the closest time bucket;
the source of the units that are available to sell;
whether units can be replenished if more are needed than are in a first time bucket;
a source from which units can be replenished if more are needed than are in the first time bucket;
a replenishment cycle for the item;
whether the item is suspended from sale; and
when stock in the item is expected to be exhausted.

37. The computing system of claim 36 wherein the detecting performed by the detection subsystem includes transmitting an asynchronous message for each detected change to availability information of an individual item.

38. The computing system of claim 37 wherein the identifying and updating is performed in response to receipt of transmitted asynchronous message by the detection subsystem.

39. The computing system of claim 36, further comprising a group item queue to which the updating subsystem adds the identified group items if not already present in the group item queue.

40. The computing system of claim 36, further comprising a transmission subsystem that, in response to a detected change to availability information of at least one individual item, for at least one of the group items identified as containing the individual item, transmits an asynchronous message indicating the updated availability information for the group item.

41. The computing system of claim 36, further comprising a broadcasting subsystem that broadcasts to a plurality of recipients an asynchronous message indicating the update of availability information for each of the identified group items whose availability information is updated.

* * * * *